March 1, 1955

O. R. BROBERG ET AL 2,703,182

PALLET LOADER

Filed Oct. 27, 1949

ORRIN R. BROBERG AND
HAROLD E. VORHIS
INVENTORS

*Theodore E. Simonton*
ATTORNEY

March 1, 1955

O. R. BROBERG ET AL 2,703,182

PALLET LOADER

Filed Oct. 27, 1949

ORRIN R. BROBERG AND
HAROLD E. VORHIS
INVENTORS

BY *Theodore E. Simonton*
ATTORNEY

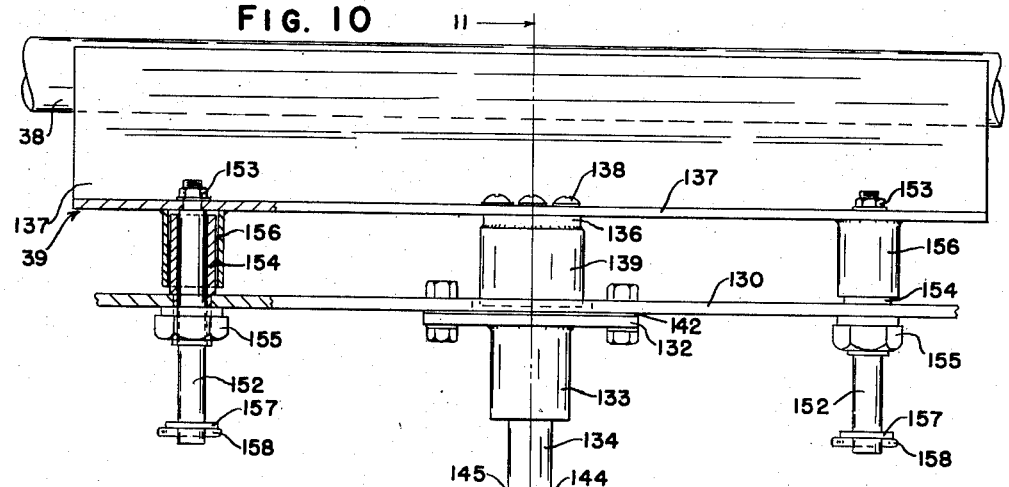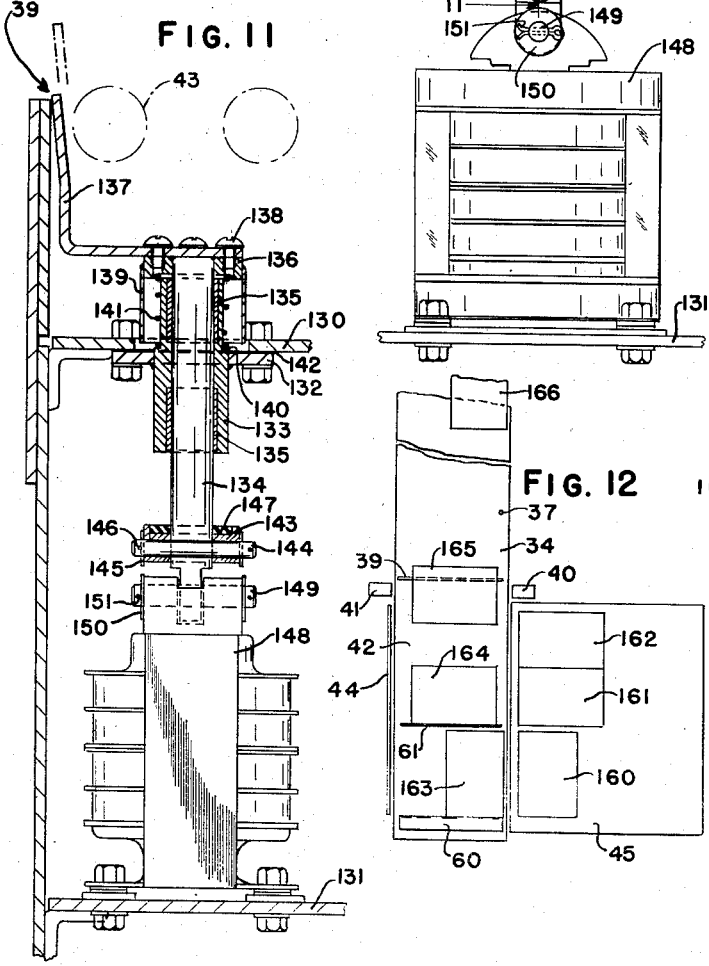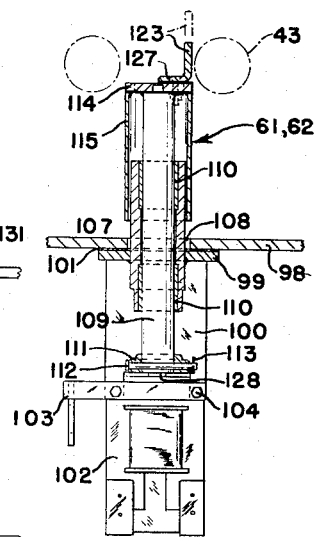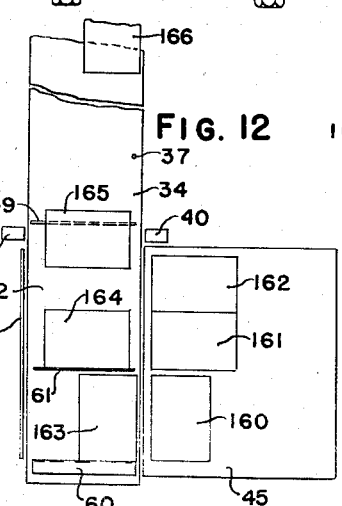

United States Patent Office 2,703,182
Patented Mar. 1, 1955

2,703,182

PALLET LOADER

Orrin R. Broberg, Fayetteville, N. Y., and Harold E. Vorhis, El Monte, Calif., assignors to Production Aids Incorporated, Los Angeles, Calif., a corporation of California Application October 27, 1949, Serial No. 123,932

6 Claims. (Cl. 214—6)

This invention relates to improvements in pallet loading machines of the general type disclosed in the prior application of John K. Bruce, Serial No. 5,850, filed February 2, 1948, and issued March 31, 1953, as Patent 2,633,251. The primary object of the present invention is to generally improve the construction and operation of pallet loaders of the foregoing type. More specifically, the principal object of this invention is to improve the mechanisms disclosed in said Bruce patent for automatically grouping and arranging a file of containers or cartons in a predetermined pattern on the loading platform of the machine, preparatory to transferring such file to the stripper pltae and thence to the pallet being loaded.

Further objects of the invention are to provide improved means for turning selected cartons through 90° as they enter the machine; to provide adjustable means for spacing the cartons of a file from one another along the loading platform; to provide improved means for preventing cartons from entering the machine until the transfer to the stripper plate of the preceding file built up on the loading platform has been completed; and to provide safety means for preventing operation of the ram for transferring cartons from the loading platform to the stripper plate while a carton is entering the machine.

To the attainment of the foregoing and other objects which will present themselves as the nature of the invention is more fully disclosed, the improvement resides in the construction, combination, and operative association of parts, one satisfactory embodiment of which is disclosed by the accompanying drawings, in which:

Figure 2 is a plan view of the automatic deflector of the machine of Figure 1;

Figure 3 is a fragmentary side elevation thereof;

Figure 4 is a sectional view on the line 4—4 of Figure 2;

Figure 9 is a sectional view on the line 9—9 of Figure 8;

Figure 10 is a front elevation of the entrance gate of the machine of Figure 1, a portion being shown in section;

Figure 11 is a sectional view on the line 11—11 of Figure 10;

Figure 12 is a diagrammatical plan view of the loading platform and adjacent parts of the machine of Figure 1, loaded with the second file of containers of a layer; and Figure 13 is a wiring diagram showing the connections of certain parts of the electrical control mechanism.

Figure 1:
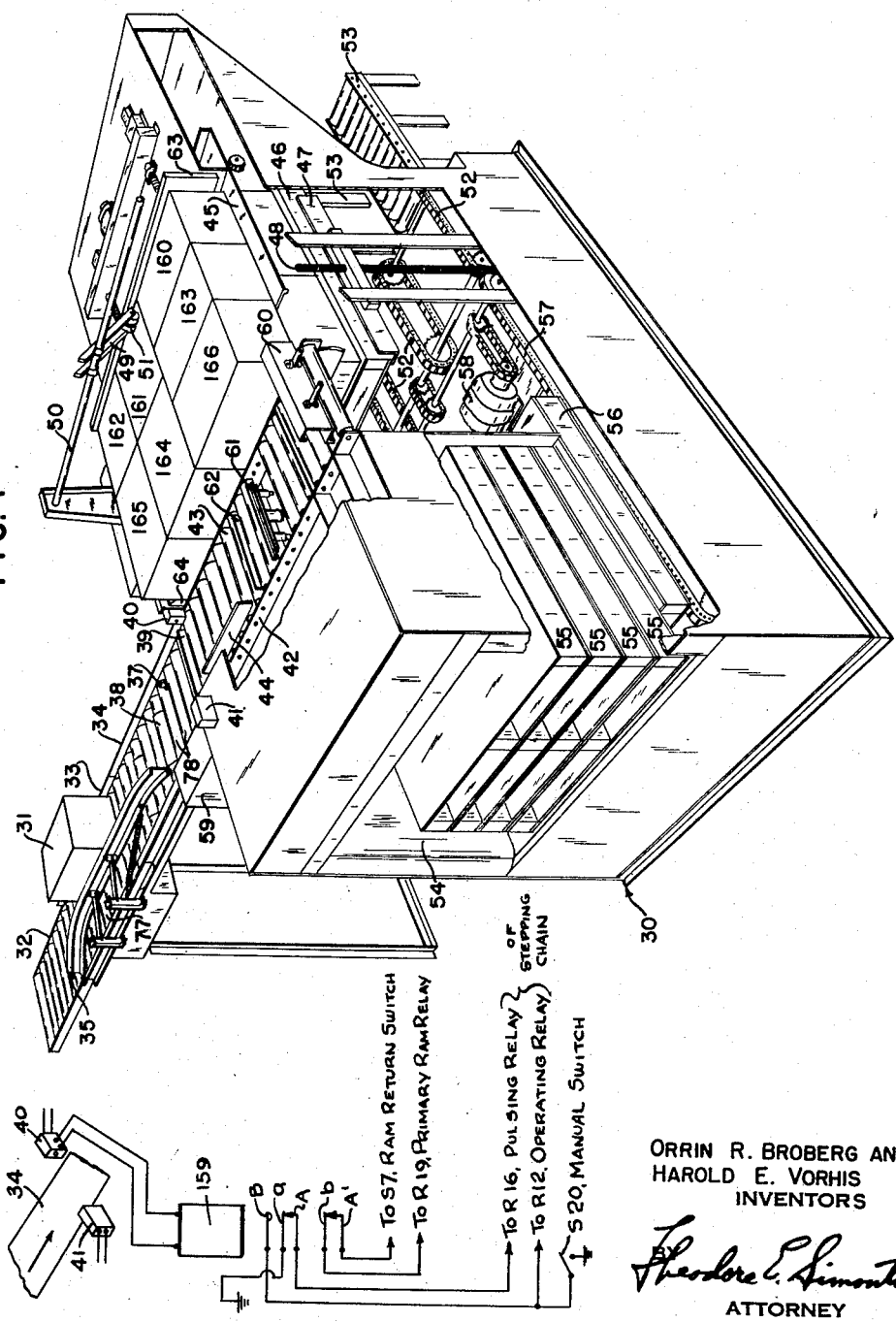
Figure 1 is a perspective view of a pallet loading machine according to this invention, parts being broken away.

The pallet loader 30 shown in Figure 1 of the drawings is of the general type disclosed in the above-mentioned Bruce patent. In general, the pallet loader of that patent comprises an entering conveyor for delivering cartons or containers successively to a loading platform; means associated with the entering conveyor for rotating pre-selected cartons through 90°, to produce a predetermined arrangement of a file of cartons on the loading platform; a ram for transferring said file of cartons from the loading platform to a stripper plate; a pallet magazine; a pallet elevator; means for transferring an empty pallet from the magazine to the elevator; means for raising the elevator with an empty pallet thereon to a position immediately beneath the normal position of the stripper plate; means for withdrawing the stripper plate when a complete layer of cartons has been rammed thereon to deposit said layer on the pallet; means for lowering the elevator a distance substantially equal to the thickness of said layer; means for returning the stripper plate to its normal position; means for repeating the foregoing operations to complete the loading of the pallet; means for discharging the fully loaded pallet from the machine; and electrical control mechanism for governing the foregoing operations and their repetitions. The electrical control mechanism includes a counting chain which may comprise a plurality of relays or a stepping switch, each unit or step of the counting chain corresponding to the entrance of a single carton into the machine so that the operation of the machine is fully automatic.

Referring more particularly to the drawings, Figure 1 shows a carton or container 31 entering the left side of the pallet loader 30 over the power-operated entering conveyors 32, 33 and 34. Each of these entering conveyors is operated at a higher speed than the preceding one, which serves in the known manner to space the cartons entering the machine from each other, should they be closely packed when delivered to the conveyor 32. The conveyors 32, 33 and 34 are normally continuously running during the operation of the machine.

The mechanism according to this invention for rotating preselected cartons through 90°, as shown generally in Figure 1, comprises a deflector rail 35 and a rotate pin 37 cooperating with the powered rolls 38 of conveyor 34. The deflector rail 35 deflects the entering cartons to the left-hand side of conveyor 33, and carton 31 is shown in the position resulting from such deflection. Assuming that the carton 31 is a carton to be turned, the rotate pin 37, which is located between two of the idler rolls of conveyor 34, is raised by the control mechanism into position to engage the left front corner of carton 31. This corner of the carton 31 is thus held from advancing while the power rolls 38 force the carton 31 to rotate 90° about pin 37. The construction and operation of this carton-rotating mechanism will be described in greater detail hereinafter.

As the carton 31 continues to advance, it passes over the entrance gate 39, then in its lowered position, and between the electric eye 40 and its light source 41. The interruption of the beam of light impinging upon the electric eye 40 from the light source 41 conditions the counting chain for actuation one step. The foregoing parts will hereinafter likewise be described in more detail.

Just beyond the entrance gate 39 and so situated and constructed as to be a continuation of the entering conveyor 34, is the loading platform 42, some of the rolls 43 of which are also power operated. When the predetermined number of cartons necessary to form a file on the loading platform as above described has passed the electric eye 40, the entrance gate 39 is automatically raised by the electrical control mechanism, thus temporarily barring the passage of further cartons to the loading platform. The ram 44 is then automatically operated to push the file of cartons from the loading platform 42 onto the stripper plate 45. After the return of the ram 44, the entrance gate 39 is lowered, another file of cartons assembled on the loading platform 42, and the operations repeated until a full layer of cartons has been built up on the stripper plate 45.

As shown in Figure 1, a full layer of cartons has been built up on the stripper plate 45, and the stripper plate is illustrated as partially withdrawn in the act of depositing the layer of cartons on a layer previously built up and deposited on the pallet 46. The carton 31 is therefore the first carton of a third layer to be formed.

The pallet 46 being loaded in Figure 1 is supported on an elevator 47 operated by an elevator screw 48. After the stripper plate 45 has been completely withdrawn, and its layer of cartons deposited on the preceding layer on the pallet 46, the elevator screw 48 is automatically operated to lower the elevator 47 and the pallet 46 a distance substantially equal to the height of the cartons. The extent of this lowering movement is governed by the hanger arms 49 pivotally mounted on the cross rod 50 and carrying at their lower ends a roller 51 adapted to bear on the tops of the cartons, the hanger arms 49 serving to operate a switch in the electrical control mechanism. The stripper plate is then returned to its original, normal position, ready to receive another layer of cartons. When the pallet 46 is fully loaded, and the elevator 47 is in its bottom position, the loaded pallet 46 is picked up by the chains 52 and carried out of the machine to the exit conveyors 53.

The above-mentioned pallet magazine is shown at 54 at the front of the machine, partially loaded with empty pallets 55. Immediately below and a little to the rear of the pallets 55 stacked in the magazine 54, is shown an empty pallet 56 previously released from the magazine and resting on a pair of chains 57, one of which can be seen at the right side of the pallet loader 30. The chains 57 carry the pallet 56 to the elevator 47 after the previously loaded pallet 46 has been removed from the elevator. A motor 58 furnishes power both for the chains 57 and the chains 52.

At the left side of the pallet loader 30, immediately in front of the conveyor 34, there may be seen in Figure 1 a portion of a cabinet 59, that serves to house the major part of the above-described electrical control mechanism, which governs the pattern in which the cartons are loaded on a pallet by the machine. When, as is frequently necessary, the machine must handle two or more different patterns, certain changes must of course be made in the wiring for each such pattern. We prefer to incorporate the circuit changes peculiar to each pattern in a separate box or cartridge within the cabinet 59, with provision for switching from one pattern cartridge to another when a change of pattern is desired.

In assembling a file of cartons on the loading platform 42, preparatory to ramming the file onto the stripper plate 45, it is necessary, of course, to stop the first carton in the file in a desired position at or near the right-hand end of the loading platform. The aforesaid Bruce Patent 2,633,251 discloses a fixed carton stop for that purpose. Figure 1 of this application illustrates, in a similar location, an automatically adjustable carton stop 60, which permits accurate centering of the file of cartons with respect to the sides of the pallet being loaded. The automatic carton stop 60 is no part of the present invention, but is described and claimed in the co-pending application of John K. Bruce and Harold J. Black, Serial No. 117,238, filed September 22, 1949, and will therefore not be described herein.

It is also necessary, for reasons that will be made clear later, to stop certain cartons in the files at predetermined positions along the loading platform 42, thereby serving to space the thus stopped carton a short distance from the preceding carton in the file. For this purpose, the present invention provides adjustable package spacers 61 and 62, shown generally in Figure 1, and described in detail hereinafter. The package spacers 61 and 62 are mounted between the rolls of the loading platform 42, and are normally lowered to an inoperative position, each being automatically raised to stopping position by a solenoid operated by the electrical control mechanism when its services are required. Two of the rolls 43 of the loading platform 42 are removed in Figure 1, and part of the ram 44 is broken away, in order to show the package spacer 61 more clearly, the other spacer being similarly constructed.

The pallet loader 30 of Figure 1 includes a stripper bar 63, which serves to hold back the layer of cartons from moving with the stripper plate 45 when the stripper plate is withdrawn to deposit the layer on the pallet; and also includes a layer closer 64, one end of which can be seen in Figure 1 projecting in front of the layer of cartons on the stripper plate 45, and which may be used to close gaps in the layer of cartons left by the package spacers 61 and 62. The stripper bar 63 and layer closer 64 form no part of the present invention and will not be described in detail herein, being fully disclosed and claimed in said Bruce and Black application.

Automatic deflector

The automatic deflector 35 cooperates with rotate pin 37 to turn preselected cartons 90° by insuring that all cartons entering conveyor 34 are deflected to the left of the conveyor. In Figures 2, 3 and 4 details of the deflector mechanism are shown. Conveyor 33 is provided with a guide rail 65 along its left hand side (Figures 2 and 4). Support brackets 66 are fastened, by welding or otherwise, to the right hand side of conveyor 33, and reinforced by angle irons 67. Vertically supported in each bracket 66 is a pintle 68 on which is pivotally mounted a hinge eye 69 having a horizontally projecting arm 70 terminating in a bearing 71. A spindle 72 passes vertically and rotatably through bearing 71 and has its ends fastened, as by welding, to the channel flanges of the deflector rail 73.

Brackets 66 and spindles 72 are equidistantly spaced on conveyor 33 and deflector rail 73 respectively so that arms 70 are always parallel as they swing about pintles 68. Arms 70 are of equal length so that, as they swing about pintles 68, the deflector rail 73 is always parallel with the guide rail 65.

The entrance end 73a of the deflector rail is curved gradually away from guide rail 65 so as to effect a funnelling action on cartons passing over conveyor 33. The exit end 73b of the deflector rail may also be curved to allow the rail to return gently to its normal position after the passage of a carton as will hereinafter be described.

A coil spring 74 is fastened under tension by means of eye-bolts 75, one end to conveyor 33 and the other end to deflector rail 73. Spring 74 is positioned at an acute angle with rail 73 and hence with conveyor 33, so that rail 73 is urged toward the guide rail 65. A series of holes 76 in rail 73 for the eye-bolt 75 may be furnished so that the tension of spring 74 may be adjusted to suit the needs of various sizes and types of cartons. A break is shown in rail 73 in Figure 2 because of the limitations of space, and the upper flange of rail 73 has been partially broken away to show the series of holes 76. It will be evident that the spring 74 urges the deflector rail 73 to the left from the position shown in Figure 2, so that it tends to approach the guide rail 65, thereby putting the deflector rail in position to contact an incoming carton. This left-ward movement of the deflector rail 73 is limited by the arms 70 striking brackets 66 when the deflector rail 73 is at substantially its minimum distance from the guide rail 65. When the width of the cartons to be loaded exceeds this minimum distance by any substantial amount, a stop or bumper, not shown, may be provided, if desired, to halt the left-ward swinging of the deflector rail before it strikes the brackets 66. Such a stop would serve to minimize the total swinging movement of the deflector rail, and could be mounted along the right-hand side of the conveyor 33. It will be understood that the construction of the conveyor 33 is otherwise conventional, some or all of the rolls 77 thereof being power driven, or the conveyor may be of the endless belt type. Conveyor 34 is a continuation of conveyor 33 and is indicated in Figure 2 by broken lines.

In the operation of the automatic deflector, a carton passing over conveyor 33 in the direction of the arrow in Figure 2, will meet the curved entrance end 73a of the deflector rail. As the carton is carried on by the conveyor, its side will have exerted upon it the pressure with which spring 74 urges rail 73 toward the guide rail 65, and the carton will be slid transversely toward the guide rail as it progresses, until its left side is pressed against guide rail 65. The carton will slide past the deflector rail 73 by pushing the deflector to the right against the action of spring 74, and will be guided along the left hand side of the conveyor. As the carton leaves the exit end 73b of the deflector rail over conveyor 34, the rail 73 will be allowed to return gradually to its normal position further toward guide rail 65 by reason of the curving of the exit end 73b.

The rotate pin

Figure 5:
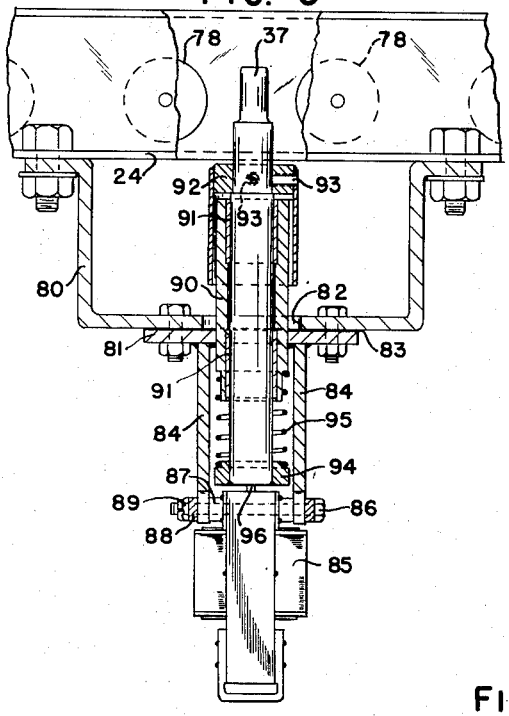
Figure 5 is a sectional view of the rotate pin of the machine of Figure 1, on the line 5—5 of Figure 6.
Figure 6:
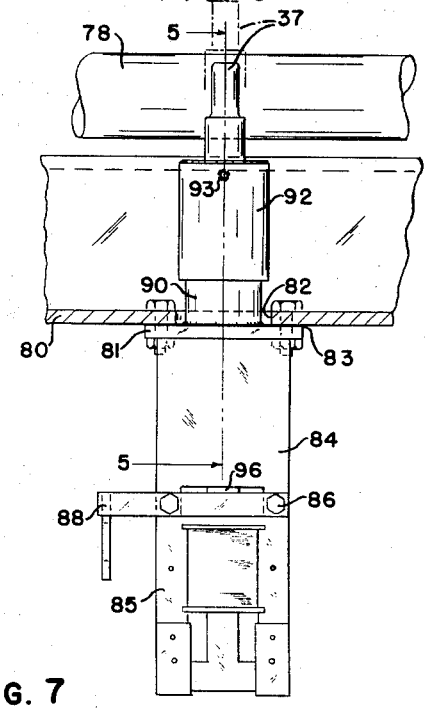
Figure 6 is a side elevation thereof.

Beyond the exit end 73b of the deflector rail 73, by a distance exceeding the length of the longest carton to be loaded, is the rotate pin 37. Pin 37 is located between two idler rolls 78 of the conveyor 34 adjacent the left side thereof. In Figures 5 and 6 are shown the details of a preferred form of the rotate pin elevating mechanism.

Across and under conveyor 34 is bolted or otherwise secured a U-shaped channel 80 to which is bolted the rotate pin support plate 81. The rotate pin 37 projects up through a hole 82 in the channel and between two of the conveyor rolls 78. A shim or sound deadening gasket 83 may be placed between channel 80 and plate 81 and may serve to adjust the heighth of the rotate pin 37 with respect to the top of rolls 78.

To the support plate 81 are secured, as by welding, the downwardly projecting side plates 84 which support a motive source, such as a reciprocating push type solenoid 85, by means of bolts 86. Spacers 87 and a hanger 88 for electric wires, may be mounted on bolts 86 and secured by their nuts 89. Also secured, as by welding, to the support plate 81 in a vertical position through a hole therein, is the guide tube 90 in which the rotate pin 37 is slidable and which may be furnished with bearing inserts 91.

The upper end of the rotate pin 37 projects beyond tube 90 and to this end is secured a dust cap 92 by means of set screws 93. To the lower end of the rotate pin 26 is secured, as by welding, the stop collar 94 and between this collar and the reduced lower end of tube 90 extends the return spring 94 coiled about rotate pin 37.

Rotate pin 37 rests against the plunger 96 of solenoid 85 by reason of gravity and the action of spring 95. When the solenoid is energized, rotate pin 37 is moved upward so that its upper end moves from the position shown in full lines in Figure 6 just below the top of rolls 78, to that indicated by broken lines. A travel of one inch has been found sufficient in practice.

In operation, the solenoid 85 is energized by the electrical control mechanism in the same manner as the lifting motor 98 of the aforementioned Bruce patent, to raise the rotate pin 37 above the top of idler rolls 78 when the predetermined pattern for which the pallet loader 30 is set calls for the turning of the succeeding carton. The turning action results from the rotate pin 37 holding the left hand front corner of the carton from advancing while the power operated rolls 38 of the conveyor 34 drive the rear of the carton forward, thus turning the carton through substantially 90° around pin 37. This turning action may be materially improved by covering one or more of the power driven rolls 38 with rubber or other friction increasing surface. Since the carton which has been rotated will continue to move forward on conveyor 34 after it has been turned substantially 90 degrees, no shut-off switch such as the switch S5 of the Bruce patent need be provided for the rotate pin, and the pin 37 need not return to its normal position until solenoid 85 is de-energized at the next non-turn step in the stepping chain.

Package spacer

Figure 7:
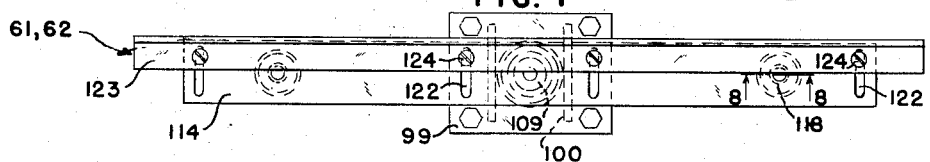
Figure 7 is a top plan view of the adjustable package spacer of the machine of Figure 1.
Figure 8:
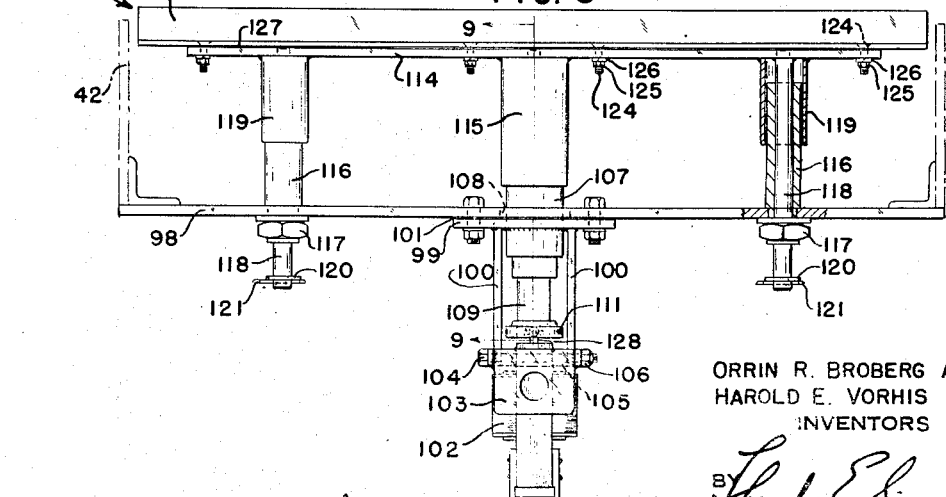
Figure 8 is an elevation thereof, a portion of which is shown in section on the line 8—8 of Figure 7.

The details of the package spacers 61 and 62 are shown in Figures 7, 8 and 9, only one being shown in these three figures as they are identical. The spacer mechanism may be supported by a cross bar 98 welded or otherwise secured to the sides of the loading platform 42 (Figure 8). To the bar 98 is bolted a support plate 99 having downwardly projecting side plates 100 secured thereto. A shim or sound deadening gasket 101 may be used between bar 98 and plate 99. To the side plates 100 are fastened a push type solenoid 102, or other motive source, and a wire supporting hanger 103, by means of bolts 104, spacers 105 and nuts 106.

To support plate 99, and passing through a hole therein, is welded, or otherwise secured, a bearing tube 107, which also extends vertically through a hole 108 in the cross bar 98. An operating rod 109 is slidable within tube 107, which may be provided with bearing inserts 110. To the lower end of rod 109 is secured the stop collar 111 by means of pin 112 and cotter pin 113. To the upper end of rod 109 is secured, by welding or otherwise, the spacer adjusting plate 114, which extends across the loading platform 42 between two of the rolls 43 thereof. To the adjusting plate 114, and about rod 109 and bearing tube 107, is secured, as by welding, the dust cap 115.

On either side of the bearing tube 107 is a vertical guide tube 116, whose reduced and threaded lower end is fastened in a cooperating hole in the cross bar 98 by a nut 117. Through each of these guide tubes 116 extends a guide rod 118 which is fastened, as by welding, to the adjusting plate 114. Also fastened to the adjusting plate, as by welding, and about guide tube 116 and rod 118, is a dust cap 119. The lower ends of guide rods 118 project below nuts 117 and have stop washers 120 thereon, retained by cotter pins 121.

The adjusting plate 114 is provided with a plurality of evenly spaced, transversely disposed slots 122, which permit the spacer stop bar 123 to be adjustably fastened to the adjusting plate by screws 124, nuts 125 and lock washers 126. A shim 127 may be introduced between adjusting plate 114 and stop bar 123. The operating rod 109 rests on plunger 128 of the solenoid 102 so that the top of the stop bar 123 is just below the level of the tops of rolls 43, as shown in full lines in Figure 9, until such time as the solenoid is energized. Plunger 128 then pushes rod 109, plate 114 and stop bar 123 to the position indicated in broken lines. A raised position of ¾ inch above the top of rolls 43 has been found sufficient to properly stop cartons proceeding down the loading platform.

A rough adjustment of either of the spacers 61 and 62 may be obtained by positioning the spacer between different pairs of rolls 43 of the loading platform 42. A fine adjustment may then be obtained by positioning the stop bar 123 with respect to the adjusting plate 114. The plate 114 is made sufficiently wide, and the slots 122 sufficiently long, so that the stop bar 123 may be adjusted to any position from the center of the adjusting plate 114 up to one of the rolls 43. By removing and reversing the stop bar 123, adjustment to any position from the center of plate 114 up to the other roll 43, may be obtained.

The operation of the spacers 61 and 62 is governed by the electrical control mechanism. When a carton is to be stopped to space it from the preceding carton in the file, the electrical control mechanism energizes the solenoid 102 in the same manner that the solenoid 85 of the rotate pin is energized, and the plunger 128 raises the operating rod 109 and the plate 114 and stop bar 123 secured thereto. The stop bar 123, being thus raised in advance of the preselected carton, stops it at the desired position along the loading platform 42. The stop bar 123 is held in its raised position by continued energization of the solenoid 102, until the file of cartons is completed and is pushed off the loading platform onto the stripper plate 45 by the ram 44. The ram 44 is sufficiently high to operate over the package spacers 61 and 62 without interfering with them. The solenoid 102 is de-energized upon the return of the ram, whereupon the package spacer drops by gravity to its normal, inoperative position.

Entrance gate

Details of the entrance gate 39 are shown in Figures 10 and 11. Cross bars 130 and 131, one above the other, are secured, by welding or otherwise, to the frame of the machine below the entrance to the loading platform 42. To the upper bar 130, beneath the center of loading platform 42, is bolted a support plate 132. To this plate is welded, or otherwise secured, the vertical operating rod bearing tube 133, in which is slidably mounted the operating rod 134. Tube 133 may be provided with bearing inserts 135. Collar 136 is secured to the upper end of the operating rod 134, by welding or otherwise, and to the collar 136, in turn, is secured the transversely extending gate stop bar 137 by means of screws 138. A downwardly extending dust cap 139 is also secured, as by welding, to collar 136. The upper end of tube 133 is reduced in diameter and, between the shoulder 140 thus produced and collar 136, a compression spring 141 is coiled about said tube. A resilient, noise deadening gasket or shim 142 may be inserted between support plate 132 and cross bar 130.

To the lower end of operating rod 134 is attached the stop collar 143 by means of pin 144, washers 145 and cotter pins 146. A resilient noise reducing washer 147 may be mounted on the upper surface of collar 143. Rod 134, below collar 143, is flattened for attachment to the plunger of pull-type solenoid 148, or other motive source, by means of pin 149, washers 150 and cotter pins 151. Solenoid 148 is bolted, or otherwise secured, to cross bar 131. The above-mentioned parts are so arranged that the gate bar 137 may be extended above the level of the tops of rolls 43 and 38 of the loading platform 42 and conveyor 34, respectively, and pulled below said level by the action of the solenoid 148. An extension above the conveyor level of about 1½ inches has been found satisfactory in practice.

To prevent twisting about in bearing tube 133, the gate bar 137 is provided with vertical, downwardly extending guide rods 152 which are joined, as by nuts 153, to said bar on either side of the bearing tube 133. The guide rods 152 are slidably mounted in guide tubes 154 whose reduced, threaded lower ends are vertically secured in holes through cross bar 130 by nuts 155. About tubes 154 and joined, as by welding, to the gate bar 137, are dust caps 156. Stop washers 157 are retained by cotter pins 158 on the lower ends of guide rods 152, which rods project below nuts 155 sufficiently to allow the up and down movement of gate bar 137.

In operation, the entrance gate 39 is normally raised to its carton-blocking position by the spring 131 acting to elevate the operating rod 134 and the attached gate bar 137. When cartons are to be admitted to the loading platform 42, the electrical control mechanism energizes the solenoid 148, which pulls down the rod 134 against the pressure of spring 131, thus permitting the cartons to pass onto the loading platform from the entering conveyor 34.

The electric eye

The electric eye 40 and its light source 41 are of standard, well-known construction, and hence need not be described in detail. As will be understood by those skilled in the art, the electric eye may serve as a switch to control any electric circuit in which it is connected. According to this invention, the electric eye is connected in the electrical control mechanism as a part thereof, and acts as the principal control switch for the entire pallet loader 30, being so connected that each switching operation of the electric eye serves to progressively step the counting chain of the electrical control mechanism once for each carton that intercepts the light beam of the electric eye.

The electrical control circuits, including said counting chain, are described in detail in the aforesaid Bruce patent 2,633,251, and hence this description need not be repeated here. It will suffice to say that the electric eye serves as a substitute for the principal control switch S4 of said Bruce patent. In said Bruce patent, said principal control switch S4 resembles a customary limit switch, and is mechanically operated by the cartons as they pass along the entering conveyor corresponding to conveyor 33 of Figure 1. Said switch S4 is located in advance of the carton rotating means and the entrance gate of said Bruce patent, so that the counting chain is stepped by each carton as it passes along the entering conveyor before reaching the carton rotating means. This arrangement requires that the carton which is at the moment the trigger carton (the one that is about to operate the switch to step the counting chain) must set up or condition the pallet loader for operations (such as carton-turning, entrance-blocking and ram-pushing) to be performed both on the trigger carton itself and on preceding cartons. According to the present invention, these parts are arranged in a different order. The carton rotating means 35—37 comes first, followed successively by the entrance gate 39 and the electric eye 40. According to the present invention, therefore, the counting chain is stepped by each carton as it enters the loading platform 42, so that the trigger carton sets up operation conditions only for itself and for succeeding cartons, thus avoiding any complications due to lateness of following cartons and permitting the setting up of package spacers. In both the pallet loader of said Bruce patent and the pallet loader 30 of the present invention, complications due to cartons following each other too closely are avoided by providing the entering conveyor with limit switches (not shown herein but disclosed in said Bruce patent), which serve to temporarily stop the entering conveyor sections 32 and 33 if a carton reaches the first limit switch before the preceding carton has passed the second limit switch.

The arrangement of the present invention has the general advantage that the chain-stepping operation occurs closer to the operations that must be controlled by the stepping of the chain, and also permits obtaining the following important special advantage. The electric eye 40 is used to operate a relay constituting a multi-pole double-throw switch, said switch being closed at one side when the light beam falls on the eye and closed at the other side when the light beam is intercepted. Moving the switch to the latter position by intercepting the beam closes a pulsing circuit which, after a brief delay of the order of one-tenth of a second, causes the stepping switch to progress one step. Moving the switch to the former position by restoring the beam, closes the ram circuit and conditions the ram for operation, it being understood that the ram circuit is also opened or closed by the counting chain. By the use of this double-throw switch controlled by the electric eye, therefore, the ram circuit is open and the ram cannot operate whenever the beam is broken by a carton. When the beam is restored, the last carton in the file will be fully on the loading platform 42, and hence in the path of the ram 44, thus avoiding the possibility of jamming said last carton between the ram and the side of the pallet loader.

The foregoing substitution of the electric eye 40 and its light source 41 for the principal control switch S4 of said Bruce patent, is shown in Figure 13, in which the reference characters preceded by "R" and "S" are the same as those of the Bruce patent and indicate corresponding parts. The relay 159 is energized by the electric eye 40 to raise the armatures $a$ and $b$ as each carton interrupts the beam of light from the source 41, and the armatures drop to their lower, normal positions when the light beam is no longer interrupted, the latter being the positions illustrated in Figure 13. The contacts A and B associated with the armature $a$ are precisely the same as the contacts A and B of the switch S4 and are connected to the operating relay R12 and the pulsing relay R16 precisely as shown in Figure 20 of the Bruce patent. The armature $b$ and its associated contact A' constitute a make-and-break switch which is connected in series with the switch S7 shown in Figure 27 of the Bruce patent, for example, by inserting the make-and-break switch in the line illustrated in said Figure 27 as running from the left-hand side of the switch S7 to the ram relay R19. It will be evident that the circuit of Figure 13 will perform exactly the operations described in the immediately preceding paragraph of this specification.

General operation

The general operation of the pallet loader 30, so far as concerns the present invention, will perhaps be clearer upon consideration of Figure 12 and the following description. Figure 12 diagrammatically illustrates the condition of the machine during the formation of the layer of cartons which is shown in Figure 1 as having just been completed. Cartons 160, 161 and 162 constitute the first file, and have already been transferred by the ram 44 from the loading platform 42 to the stripper plate 45. Cartons 163, 164 and 165 constitute the second file. Cartons 163 and 164 have already reached their stations on the loading platform, resting against the carton stop 60 and the package spacer 61, respectively, and carton 165 is shown entering the loading platform 42 and still intercepting the light beam to the electric eye 40.

We will start the detailed description of the operation with carton 163, assuming that this carton is being held back by the entrance gate 39 while the ram 44 is returning to its normal position, shown in Figure 12, after pushing cartons 160, 161 and 162 onto the stripper plate. As soon the ram has returned, the solenoid 148 of the entrance gate 39 is energized by the electrical control mechanism, and pulls the gate stop bar 137 below the level of the top of the rolls 43 of the loading platform against the pressure of spring 141. The carton 163 thereupon enters the loading platform, and intercepts the light beam to the electric eye 40, causing the counting chain to be advanced one step. In this position of the counting chain, the solenoids 102 of both package spacers 61 and 62 are de-energized, leaving the package spacers in their normal retracted positions and permitting the carton 163 to continue its movement until it strikes the carton stop 60. The solenoid 85, on the contrary, is energized in this position of the counting chain, and pushes the rotate pin 37 up into the path of the oncoming carton 164, the position of which may then be approximately that of the carton 166 shown in Figure 12. The carton 164 thus strikes the rotate pin, is turned through 90°, and, in its turn, intercepts the light beam to the electric eye 40. As carton 164 passes the electric eye, the counting chain is again advanced one step, and in this position of the chain, the solenoid 102 of the package spacer 61 is energized, the solenoid 102 of the package spacer 62 still being de-energized. The package spacer 61 is thus raised in time to stop the carton 164 in the position shown in Figure 12. The solenoid 148 of the entrance gate 39 is still energized in this position of the counting chain, and the solenoid 85 of the rotate pin 37 is again energized to raise the rotate pin in the path of the oncoming carton 165. The carton 165 is thus rotated and continues over the lowered entrance gate until it, in its turn, intercepts the light beam to the electric eye 40, as shown in Figure 12, and steps the counting chain once more.

At the step of the counting chain resulting from the passage of carton 165, the ram circuit is closed after a slight delay sufficient to permit the carton 165 to come to rest against the carton 164. The ram 44 then pushes the file of cartons 163, 164 and 165 onto the stripper plate 45. At this same step of the counting chain, the solenoid 148 is de-energized to permit the stop bar 137 of the gate 39 to rise in the path of the oncoming carton 166, and the solenoid 85 of the rotate pin 37 is also de-energized, since the carton 166, like the cartons 160 and 163, is not to be turned. The carton 166 thus may continue its movement until it strikes the entrance gate 39.

During the pushing operation just described, it will be evident that the carton 164 must move past the rear ends of cartons 163 and 160, and that the cartons 164 and 165 must push the cartons 161 and 162 so that the carton 161 also travels past the rear end of the carton 160. The purpose of the package spacer 61 is to leave a slight space between the cartons 160 and 161 and the cartons 163 and 164 so that the cartons may move past each other as just described, despite any minor irregularities in the cartons or in their positions. The energization of solenoid 102 of the package spacer 61 is continued during the forward movement of the ram to prevent the rotation of the loading platform rolls from closing the desired space between the cartons 163 and 164. As above described, the ram is sufficiently high so that it may travel forward and back over the package spacer 61 without interference. The return of the ram to its normal position automatically establishes a circuit through the solenoid 148 of the entrance gate 39, thus lowering the entrance gate from its normally raised position, and permitting the carton 166 to enter the loading platform 42.

The carton 166 is the only carton in the third and last file making up the layer of cartons shown on the stripper plate 45 in Figure 1. In the position of the counting chain to which it is stepped by the carton 166 passing the electric eye, the two solenoids 102 and the solenoid 148 are de-energized, permitting the package spacers 61 and 62 to remain in their normal retracted, inoperative positions, and the entrance gate 39 to rise behind carton 166 under the influence of the spring 141 to its normal operative position. The carton 166 is thus permitted to proceed until it occupies the position of the carton 163 in Figure 12, the entrance gate 39 being in the meantime in position to hold back the first carton of the succeeding layer. This first carton, which corresponds to carton 31 of Figure 1, would occupy the same relative position as the carton shown at the extreme right-hand corner of the layer already deposited on the pallet 46 in Figure 1, and hence, in the position of the counting chain produced by the carton 166, the solenoid 85 is energized and the rotate pin 37 raised in the path of the oncoming carton 31.

In the position of the counting chain produced by the carton 166 passing the electric eye, the ram 44 is again conditioned for operation after a slight time delay sufficient to permit carton 166 to reach the carton stop 60. The carton 166, in being pushed onto the stripper plate 45, pushes the cartons 163 and 160 into the positions shown in Figure 1. After the return of the ram 44, and while the next file is being assembled on the loading platform, the layer closer 64 may be operated to close the gaps left by the package spacer 61, as more particularly described in the Bruce and Black application mentioned above.

The package spacer 62 is not used during the formation of the layer shown on the stripper plate 45 in Figure 1, but comes into play during the formation of the preceding and the succeeding layers, as more particularly described in said Bruce and Black application, the package spacer 61, in its turn, being inoperative during the formation of these alternate layers.

While we have herein described, and in the drawings shown, illustrative embodiments of our invention, it is to be understood that the invention is not limited thereto, but may comprehend other constructions, arrangements of parts, details and features without departing from the spirit of the invention. We desire to be limited, therefore, only by the scope of the appended claims.

We claim:
1. In an entering conveyor adapted to successively propel cartons into a pallet loading machine of the type having electrical control mechanism comprising a counting chain progressively stepped by the entrance of each carton into the machine, the combination of means for rotating preselected cartons through 90°, comprising a fixed guide rail along one side of said entering conveyor, a movable deflector rail hingedly supported above said conveyor adjacent the other side thereof, said deflector rail being adapted to swing toward said guide rail so that the deflector rail is maintained substantially parallel to said guide rail, resilient means for urging said deflector rail toward said guide rail, a rotate pin located adjacent the guide rail side of the entering conveyor and beyond said deflector rail, and power-operated means for selectively moving said rotate pin into and out of position to engage the leading end of a carton near a corner thereof, said pin in its operative position serving to stop the forward movement of said corner while the carton is driven forward by the entering conveyor, thereby turning the carton substantially 90° about the rotate pin, and said electrical control mechanism serving to automatically actuate said power-operated means to move said rotate pin to operative position in advance of preselected cartons, whereby preselected cartons in a file may be turned in accordance with a predetermined pallet loading pattern.

2. In an entering conveyor adapted to successively propel cartons into a pallet loading machine of the type having electrical control mechanism comprising a counting chain progressively stepped by the entrance of each carton into the machine, the combination of means for rotating preselected cartons through 90°, comprising a fixed guide rail along one side of said entering conveyor, a movable deflector rail hingedly supported above said conveyor adjacent the other side thereof, said deflector rail being adapted to swing toward said guide rail so that the deflector rail is maintained substantially parallel to said guide rail, said deflector rail having both ends curved gradually away from said fixed guide rail, resilient means for urging said deflector rail toward said guide rail, a normally retracted rotate pin located adjacent the guide rail side of the entering conveyor and beyond said deflector rail, and power-operated means for raising said rotate pin into position to engage the leading end of a carton near a corner thereof to stop the forward movement of said corner while the carton is driven forward by the entering conveyor, thereby turning the carton substantially 90° about the rotate pin, and said electrical control mechanism serving to automatically actuate said power-operated means to move said rotate pin to operative position in advance of preselected cartons, whereby cartons passing over said feed conveyor are automatically moved over against said fixed guide rail and preselected cartons in a file may be turned in accordance with a predetermined pallet loading pattern.

3. In a pallet loading machine of the type having an entering conveyor discharging onto a loading platform adapted to propel cartons entering the machine in single file toward the end of said platform, a ram for pushing successive files of cartons from said platform to form a layer of cartons on a pallet, and electrical control mechanism comprising a counting chain progressively stepped by the entrance of each carton into the machine, the improvement in means for automatically arranging a file of cartons on the loading platform preparatory to being pushed therefrom, which comprises, in combination, means for guiding cartons along one side of said entering conveyor, a rotate pin located adjacent said side of the entering conveyor and beyond said guiding means, power-operated means for selectively moving said rotate pin into and out of position to engage the leading end of a carton near the corner thereof, said pin in its operative position causing preselected cartons to rotate through substantially 90°, spacer means adjustably mounted along said platform for stopping preselected cartons of a file at predetermined points in their travel along said platform, power-operated means for selectively moving said spacer means into and out of position to stop said cartons, an electric eye located adjacent the junction of said entering conveyor and said loading platform and serving as the principal control switch of said electrical control mechanism to progressively step the same once for each carton that intercepts the beam of the electric eye, said electrical control mechanism serving to automatically actuate said power-operated means to move said rotate pin and said spacer means to their operative positions in advance of preselected cartons, whereby successive files of a layer of cartons may each be built up on said loading platform in accordance with a predetermined pallet loading pattern preparatory to being pushed from said platform, and said electric eye being so connected in the electrical control mechanism as to prevent the operation of the ram while a carton is passing the electric eye, whereby the ram is not conditioned for operation until the last carton in the file has cleared the electric eye and is fully on the loading platform in the path of the ram.

4. In a pallet loading machine of the type having an entering conveyor discharging onto a loading platform adapted to propel cartons entering the machine in single file toward the end of said platform, a ram for pushing successive files of cartons from said platform to form a layer of cartons on a pallet, and electrical control mechanism comprising a counting chain progressively stepped by the entrance of each carton into the machine, the improvement in means for automatically arranging a file of cartons on the loading platform preparatory to being pushed therefrom, which comprises, in combination, means for guiding cartons along one side of said entering conveyor, a rotate pin located adjacent said side of the entering conveyor and beyond said guiding means, power-operated means for selectively moving said rotate pin into and out of position to engage the leading end of a carton near the corner thereof, said pin in its operative position causing preselected cartons to rotate through substantially 90°, an electric eye located adjacent the junction of said entering conveyor and said loading platform and serving as the principal control switch of said electrical control mechanism to progressively step the same once for each carton that intercepts the beam of the electric eye, said electrical control mechanism serving to automatically actuate said power-operated means to move said rotate pin to its operative position in advance of preselected cartons, whereby successive files of a layer of cartons may each be built up on said loading platform in accordance with a predetermined pallet loading pattern preparatory to being pushed from said platform, and said electric eye being so connected in the electrical control mechanism as to prevent the operation of the ram while a carton is passing the electric eye, whereby the ram is not conditioned for operation until the last carton in the file has cleared the electric eye and is fully on the loading platform in the path of the ram.

5. In a pallet loading machine of the type having an entering conveyor discharging onto a loading platform adapted to propel cartons entering the machine in single file toward the end of said platform, a ram for pushing successive files of cartons from said platform to form a layer of cartons on a pallet, and electrical control mechanism comprising a counting chain progressively stepped by the entrance of each carton into the machine, the improvement in means for automatically arranging a file of cartons on the loading platform preparatory to being pushed therefrom, which comprises, in combination, means for guiding cartons along one side of said entering conveyor, a normally retracted rotate pin located adjacent said side of the entering conveyor and beyond said guiding means, power-operated means for raising said rotate pin into position to engage the leading end of a carton near the corner thereof, thereby causing preselected cartons to rotate through substantially 90°, an electric eye located adjacent the junction of said entering conveyor and said loading platform and serving as the principal control switch of said electrical control mechanism to progressively step the same once for each carton that intercepts the beam of the electric eye, and said electrical control mechanism serving to automatically actuate said power-operated means to raise said rotate pin in advance of preselected cartons, whereby successive files of a layer of cartons may each be built up on said loading platform in accordance with a predetermined pallet loading pattern preparatory to being pushed from said platform.

6. In a pallet loading machine of the type having an entering conveyor discharging onto a loading platform adapted to propel cartons entering the machine in single file toward the end of said platform, a ram for pushing successive files of cartons from said platform to form a layer of cartons on a pallet, and electrical control mechanism comprising a counting chain progressively stepped by the entrance of each carton into the machine, the improvement in means for automatically arranging a file of cartons on the loading platform preparatory to being pushed therefrom, which comprises, in combination, means for guiding cartons along one side of said entering conveyor, a rotate pin located adjacent said side of the entering conveyor and beyond said guiding means, power-operated means for selectively moving said rotate pin into and out of position to engage the leading end of a carton near the corner thereof, said pin in its operative position causing preselected cartons to rotate through substantially 90°, a package spacer for stopping preselected cartons of a file at predetermined points in their travel along said platform, said package spacer being adapted to be mounted at different positions along said loading platform and having independent means for longitudinal adjustment of the package spacer with respect to any such mounting position, power-operated means for selectively raising and lowering said spacer into and out of position to stop said cartons, an electric eye located adjacent the junction of said entering conveyor and said loading platform and serving as the principal control switch of said electrical control mechanism to progressively step the same once for each carton that intercepts the beam of the electric eye, and said electrical control mechanism serving to automatically actuate said power-operated means to move said rotate pin and said spacer to their operative positions in advance of preselected cartons, whereby successive files of a layer of cartons may each be built up on said loading platform in accordance with a predetermined pallet loading pattern preparatory to being pushed from said platform, and whereby a preselected carton in a file may be pushed from said loading platform without interfering with rotated cartons of files previously pushed from said platform.

References Cited in the file of this patent

UNITED STATES PATENTS

| | | |
|---|---|---|
| 2,019,843 | Clark | Nov. 5, 1935 |
| 2,120,314 | Spellacy | June 14, 1938 |
| 2,508,861 | Jessen | May 23, 1950 |